US011647755B1

(12) United States Patent
Santos

(10) Patent No.: US 11,647,755 B1
(45) Date of Patent: May 16, 2023

(54) EGG ROLL ROLLING MACHINE

(71) Applicant: Rommel Santos, Pensacola, FL (US)

(72) Inventor: Rommel Santos, Pensacola, FL (US)

(*) Notice: Subject to any disclaimer, the term of this patent is extended or adjusted under 35 U.S.C. 154(b) by 0 days.

(21) Appl. No.: 17/725,782

(22) Filed: Apr. 21, 2022

(51) Int. Cl.
*A21C 9/06* (2006.01)

(52) U.S. Cl.
CPC .................... *A21C 9/063* (2013.01)

(58) Field of Classification Search
CPC ........... A21C 9/063; A21C 9/06; A21C 9/088; B29C 43/48; B29C 53/043
See application file for complete search history.

(56) References Cited

U.S. PATENT DOCUMENTS

| | | | | | |
|---|---|---|---|---|---|
| 1,582,382 | A | * | 4/1926 | Collis | A21C 3/02 |
| | | | | | 425/328 |
| 2,450,033 | A | * | 9/1948 | Cohen | A21C 9/04 |
| | | | | | 118/15 |
| 2,642,012 | A | * | 6/1953 | Sticelber | A21C 3/02 |
| | | | | | 425/320 |
| 2,677,334 | A | * | 5/1954 | Hansen | A21C 7/01 |
| | | | | | 425/372 |
| 2,746,403 | A | * | 5/1956 | Hansen | A21C 3/02 |
| | | | | | 426/501 |
| 3,167,032 | A | * | 1/1965 | Rhodes | A21C 9/04 |
| | | | | | 425/106 |
| 3,633,517 | A | * | 1/1972 | Kao | A21C 9/04 |
| | | | | | 99/450.6 |
| 4,110,482 | A | * | 8/1978 | Sato | A21C 15/00 |
| | | | | | 426/514 |
| 4,321,858 | A | * | 3/1982 | Williams | A21C 9/063 |
| | | | | | 99/450.6 |
| 4,388,059 | A | | 6/1983 | Ma | |
| 4,880,375 | A | * | 11/1989 | Hayashi | A21C 3/027 |
| | | | | | 425/363 |
| 4,905,583 | A | * | 3/1990 | Hayashi | A21C 3/02 |
| | | | | | 99/450.2 |
| 4,913,043 | A | * | 4/1990 | Cheung | A21C 9/063 |
| | | | | | 425/363 |
| 4,961,949 | A | * | 10/1990 | Barnes | A23G 3/0236 |
| | | | | | 426/500 |
| 5,018,439 | A | * | 5/1991 | Bordin | A21C 3/06 |
| | | | | | 99/450.2 |
| 5,137,672 | A | * | 8/1992 | Fujiu | B29C 48/395 |
| | | | | | 264/130 |
| 5,161,458 | A | * | 11/1992 | Cheung | A21C 9/063 |
| | | | | | 99/450.6 |
| 5,257,573 | A | * | 11/1993 | Kimura | A21C 3/06 |
| | | | | | 99/450.2 |

(Continued)

*Primary Examiner* — Emmanuel S Luk
(74) *Attorney, Agent, or Firm* — Sanchelima & Associates, P.A.; Christian Sanchelima; Jesus Sanchelima

(57) ABSTRACT

An eggroll rolling machine including a conveying assembly, a pivoting assembly, and an electronic assembly. The conveying assembly includes a conveying belt and head pulleys. Head pulleys rotate to slide the conveying belt. The pivoting assembly includes a block. The block is fixed to the conveying assembly through fasteners. The electronic assembly includes a motor. The motor rotates the head pulleys to slide the conveying belt. A partially made eggroll is placed in one end of the conveying belt and slides in the conveying belt to the block. The block pushes the partially made eggroll while the eggroll slides with the conveying belt to form an eggroll.

6 Claims, 3 Drawing Sheets

(56) References Cited

U.S. PATENT DOCUMENTS

| | | | | |
|---|---|---|---|---|
| 5,281,120 | A | * | 1/1994 | Morikawa .............. A21C 9/063 99/450.2 |
| 5,289,761 | A | * | 3/1994 | Spierts ................... A21D 13/44 99/450.2 |
| 5,655,439 | A | * | 8/1997 | Ueno ....................... A21C 3/06 99/450.2 |
| 6,106,880 | A | | 8/2000 | Harada |
| 6,207,212 | B1 | * | 3/2001 | Nanahara ................. A21C 9/08 425/335 |
| 6,355,288 | B1 | * | 3/2002 | DiGiacomo ........... A21C 9/063 426/282 |
| 7,156,642 | B2 | * | 1/2007 | Anderson .............. A21C 11/10 425/335 |
| 8,668,485 | B1 | * | 3/2014 | Emerson .................. A21C 3/06 425/297 |
| 9,943,100 | B2 | * | 4/2018 | Da Ponte ................ A23L 13/03 |
| 2003/0118684 | A1 | * | 6/2003 | Finkowski ............. A21C 9/063 425/208 |
| 2008/0206388 | A1 | * | 8/2008 | Bond ................... A21C 11/002 425/288 |
| 2010/0247729 | A1 | * | 9/2010 | Van Blokland ........ A21C 9/063 426/502 |
| 2015/0216225 | A1 | * | 8/2015 | Da Ponte ................ A23P 20/25 426/514 |
| 2021/0045391 | A1 | * | 2/2021 | Harada .................... A21C 3/06 |
| 2022/0061337 | A1 | * | 3/2022 | Bernhardt ................ A21C 9/08 |

* cited by examiner

US 11,647,755 B1

EGG ROLL ROLLING MACHINE

BACKGROUND OF THE INVENTION

1. Field of the Invention.

The present invention relates to an eggroll rolling machine and, more particularly, to an eggroll rolling machine that allows to roll partially made eggrolls.

2. Description of the Related Art.

Several designs for an eggroll rolling machine have been designed in the past. None of them, however, include a reductor to regulate the velocity of the conveying belt where partially made eggrolls become eggrolls by means of a block that rolls them up.

Applicant believes that a related reference corresponds to U.S. Pat. No. 6,106,880 issued for a method and apparatus for making cylindrical food item. Applicant believes that another related reference corresponds to U.S. Pat. No. 4,388,059 issued for an automatic egg roll making machine. None of these references, however, teach of an egg roll forming machine that is comprised of a small motor driven device with and endless belt conveying mechanism and a pivoted forming block in which a partially formed egg roll is placed on the conveying mechanism and is drawn under a pivoting forming block which roll the egg roll into the proper shape.

Other documents describing the closest subject matter provide for a number of more or less complicated features that fail to solve the problem in an efficient and economical way. None of these patents suggest the novel features of the present invention.

SUMMARY OF THE INVENTION

It is one of the objects of the present invention to provide an eggroll rolling machine that includes a block to form eggrolls when a partially made eggroll slides through a conveying belt of the invention.

It is another object of this invention to provide an eggroll rolling machine that includes a conveying belt to place and slide continuously partially made eggrolls.

It is still another object of the present invention to provide an eggroll rolling machine that includes a motor to slide the conveying belt.

It is yet another object of this invention to provide such a device that is inexpensive to implement and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE EMBODIMENTS OF THE INVENTION

Figure 1:
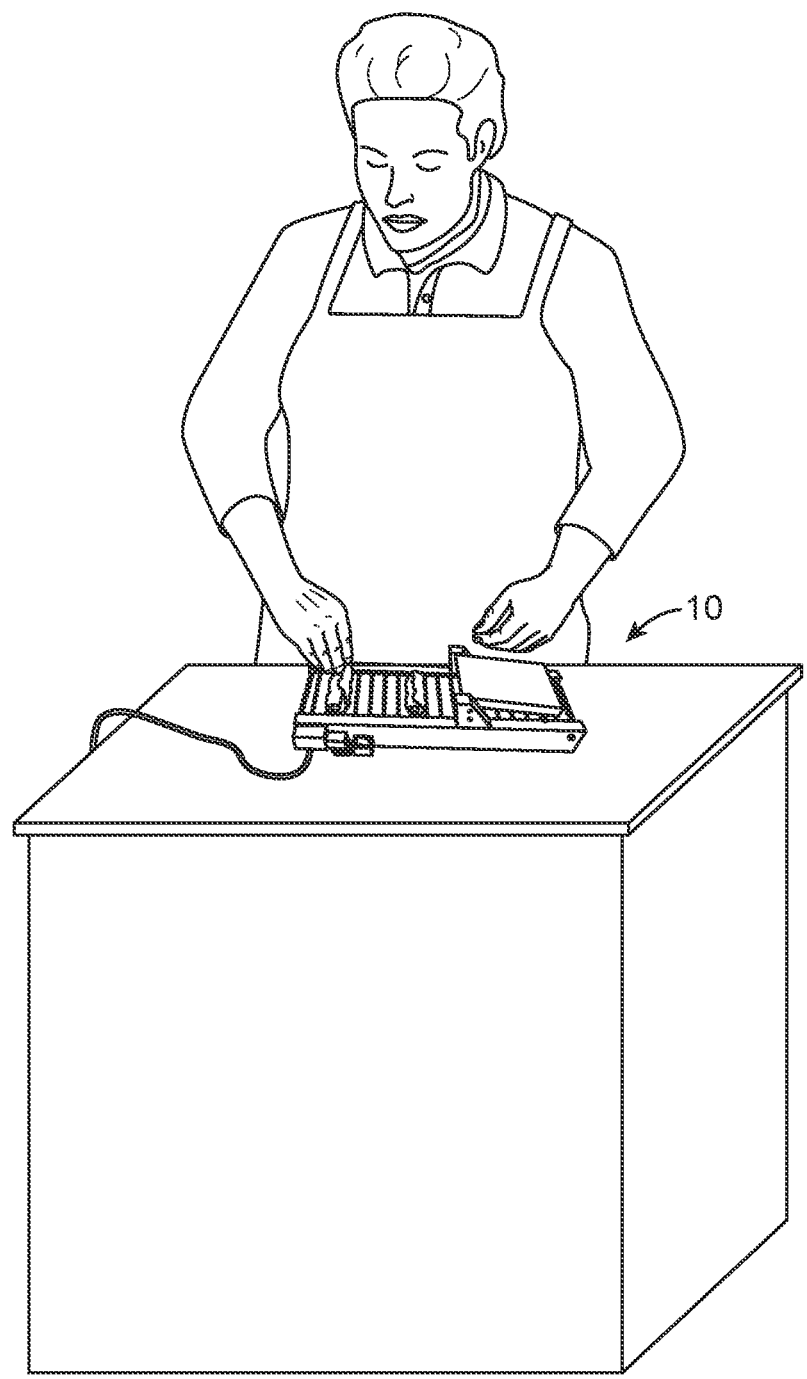
FIG. 1 represents an isometric operational view of the present invention 10.
Figure 2:
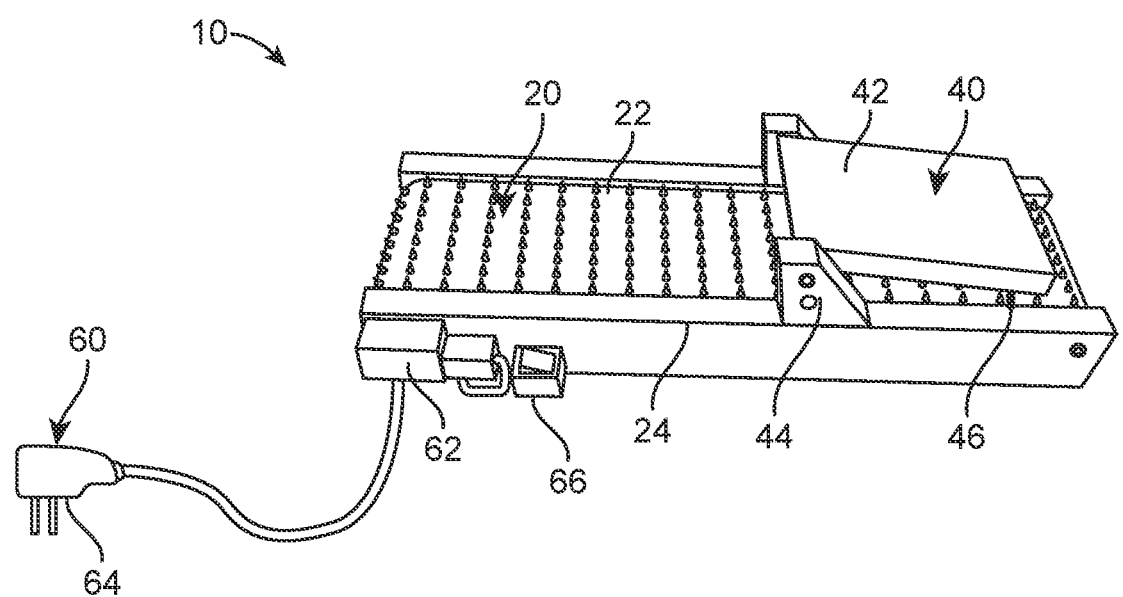
FIG. 2 shows an isometric view of present invention 10. The present invention 10 includes a conveying assembly 20, a pivoting assembly 40 and an electronic assembly 60.
Figure 3:
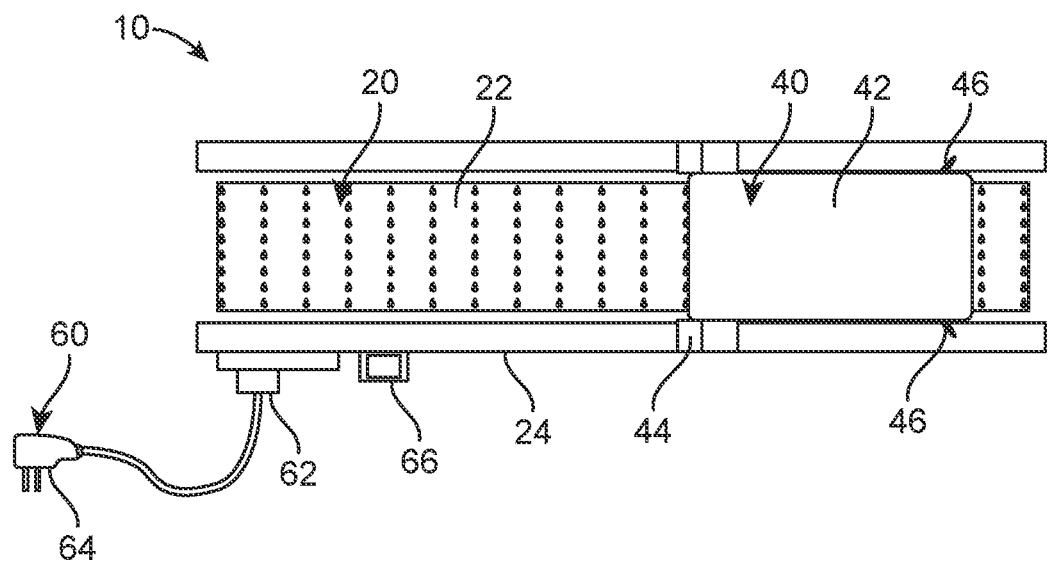
FIG. 3 illustrates a top view of present invention 10.

Referring now to the drawings, where the present invention is generally referred to with numeral 10, it can be observed that it basically includes a conveying assembly 20, a pivoting assembly 40 and an electronic assembly 60. It should be understood there are modifications and variations of the invention that are too numerous to be listed but that all fit within the scope of the invention. Also, singular words should be read as plural and vice versa and masculine as feminine and vice versa, where appropriate, and alternative embodiments do not necessarily imply that the two are mutually exclusive.

The conveying assembly 20 may include a belt 22, a conveyor bed 24, head pulleys 26 and spikes 28. The conveyor bed 24 may have a substantially rectangular shape. In a preferred embodiment the conveyor bed 24 may be thinner than the lateral portions of the conveyor bed 24. In a preferred embodiment the lateral portions of the conveyor bed 24 may rest on the floor. In a preferred embodiment the conveyor bed 24 may be made of metal. It also may be suitable for the conveyor bed 24 to be made of plastic, ceramic, or any other suitable material.

The conveyor bed 24 may have ends. In a preferred embodiment the head pulleys 26 may be vertically attached to the ends of the central portion of the conveyor bed 24 and along said conveyor bed 24. In a preferred embodiment the head pulleys 26 may be four head pulleys. It also may be suitable to have additional head pulleys 26 along the central portion of the conveyor bed 24. In a preferred embodiment the head pulleys 26 may rotate to slide the belt 22 along the central portion of the conveyor bed 24. In a preferred embodiment the head pulleys 26 may have a tubular shape. It also may be suitable for the head pulleys 26 to have a rectangular shape, a triangular shape or any other suitable that allows the belt 22 to slide. The belt 22 may surround the central portion of the conveyor bed 24. The belt 22 may be in abutting contact with the central portion of the conveyor bed 24. In a preferred embodiment the belt 22 may be made of rubber composite. It also may be suitable for the belt 22 to be made of plastic, leather, cloth, or any other suitable material. In a preferred embodiment the belt 22 has a rectangular elongated shape of a continuous belt. The spikes 28 may be attached to the belt 22. In a preferred embodiment the spikes 28 may be made of metal. It also may be suitable for the spikes 28 to be made of plastic, ceramic, wood, or any other suitable material. The spikes 28 may help to avoid the partially made eggroll to move from a predetermined position in the belt 22.

Figure 4:
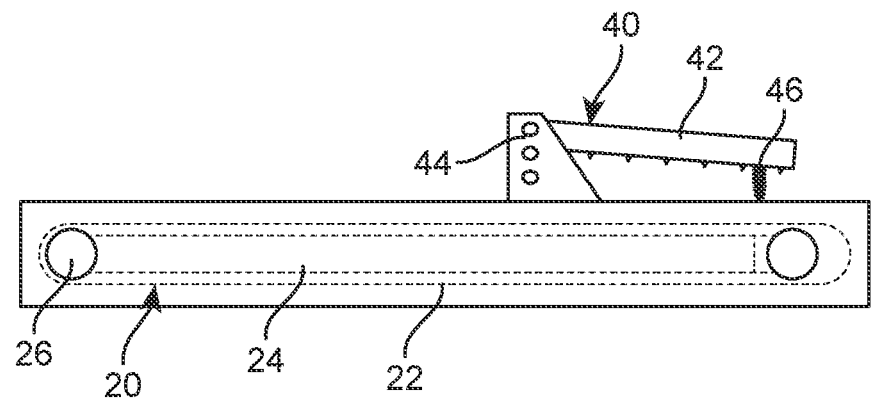
FIG. 4 is a representation of an enlarged left side view of conveying assembly 20 and pivoting assembly 40. Pivoting assembly 40 includes a forming block 42, pivot 44 and fasteners 46. Electronic assembly 60 is not shown in this figure.

Referring now to FIG. 4 the pivoting assembly may include a block 42, a pivot 44 and fasteners 46. In a preferred embodiment the block 42 may have a substantially rectangular shape. It also may be suitable for the block 42 to have a rectangular shape, a triangular shape, a curved shape, or any other suitable shape. In a preferred embodiment the block 42 may be made of wood. It also may be suitable for the block 42 to be made of plastic, metal, ceramic, or any other suitable material. The block 42 may have two ends. In a preferred embodiment the sides of the first end of the block 42 may be perpendicularly connected to the pivot 44. In a preferred embodiment the pivot 44 may be attached to the conveyor bed 26 in such way that allows the block 42 to rotate in the head of said pivot 44. In a preferred embodiment the pivot 44 is made of metal. It also may be suitable for the pivot 44 to be made of wood, plastic, or any other suitable material. The pivot 44 may have a semi tapered shape. It also may be suitable for the pivot 44 to have a rectangular shape, a circular shape, or any other shape. The pivot 44 may have openings to accommodate the block 42 to different heights for different sized eggrolls.

In a preferred embodiment the fasteners 46 may be attached to the sides of the other end of the block 42. In a preferred embodiment the fasteners 46 may be placed over the lateral portions of the conveyor bed 24. In a preferred embodiment the fasteners 46 may be made of metal. It also may be suitable for the fasteners 46 to be made of plastic, wood, or any other suitable material. In a preferred embodiment a partially made egg roll may be transported by the belt 22 over a central portion of the conveyor bed 24. In a preferred embodiment the block 42 may press the partially made eggroll whiles is being slide in the belt 22 to form an eggroll. In a preferred embodiment the other end of the block 42 that has the fasteners 24 may move up and down to accommodate to different sizes of eggrolls. The fasteners 46 may be moved away of the lateral portions of the conveyor bed 24 when the block rotates up. The block 42 may have a separation. Partially made eggrolls may be sided and pushed over the bottom portion of the block 42.

The electronic assembly 60 may include a motor 62, a cord 64 and a switch 66. The motor 62 may be a servo motor, a stepper motor, a dc brushed motor or any other motor known in the prior art. In a preferred embodiment the motor may rotate the head pulleys 26. The motor 62 may be located on a side outer wall of the conveyor bed 24. The conveyor bed 24 may have modifications to allow connection of the motor 62 and the head pulleys 26. The cord 64 may be connected to the motor 62. In a preferred embodiment the cord 62 may be connected to the power supply to provide power to the motor 62. The cord 62 may be a wire connected to the electrical outlet. The cord 62 may have a plastic cover.

The switch 66 may be located on a side outer portion of the conveying assembly 20. The switch 66 may be connected to the motor 62. The switch 64 may activate or deactivate the motor 62. In a preferred embodiment the user may place the partially made eggroll in the belt 22. In a preferred embodiment the partially made eggroll may slide against the block 42 to form an eggroll. The partially made eggroll may keep in place through the spikes 28. The invention may be turned off or on through the switch 66.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. An eggroll rolling machine, comprising:
   a conveying assembly, wherein said conveying assembly includes a belt and a conveyor bed, wherein said conveyor bed includes lateral portions and a central portion, wherein said belt is a conveying belt, said belt slides on said central portion of said conveyor bed, wherein said lateral portions have a greater height than a height of said central portion, wherein said lateral portions have a rectangular elongated shape, having a planar bottom end, wherein said conveyor belt has spikes, said spikes are configured to fix said partially made eggroll to said conveyor belt, wherein said spikes have a conical shape, wherein said spikes are equidistantly disposed along the outer surface of said conveyor belt;
   a pivoting assembly including a block, fasteners and a pivot, wherein said block is separated a predetermined distance form said conveying assembly, wherein partially made eggrolls slide with said conveying belt to said block, said block pushes said partially made eggrolls to form eggrolls, wherein said pivot is attached to said lateral portions of said conveyor bed, wherein a first end of said block is perpendicularly placed over said pivot, said block is capable of rotating over said pivot, wherein said pivot has openings to accommodate said block in predetermined heights of said pivot, wherein said openings are collinear therebetween, said openings form a vertical arrangement of openings having a predetermined separation therebetween, wherein each of said openings transversely go through said pivot, wherein said pivot has a right-trapezium shape, wherein said fasteners are attached to the sides of a second end of said block, wherein said fasteners protrude downwardly from said second end having a predetermined inclination, wherein said fasteners rest over said lateral portions of said conveyor bed, said second end is diametrically opposite to said first end, said second end of said block moves up and down to accommodate different sizes of partially made eggrolls, said second end of said block moves up and down when said first end of said block rotates over said pivot; and
   an electronic assembly, wherein said electronic assembly includes a motor, said motor is capable of sliding said conveying belt.

2. The eggroll rolling machine set forth in claim 1, wherein said conveying assembly includes head pulleys, said head pulleys are attached along said conveyor bed, said head pulleys rotate to slide said belt.

3. The eggroll rolling machine set forth in claim 1, wherein said fasteners are placed over said lateral portions of said conveyor belt, said fasteners avoid said block to touch said conveying assembly.

4. The eggroll rolling machine set forth in claim 1, wherein said electronic assembly includes a switch.

5. The eggroll rolling machine set forth in claim 4, wherein said switch is connected to said motor to turn off or turn on said motor.

6. An eggroll rolling machine, consisting of:
   a conveying assembly, wherein said conveying assembly includes a belt, head pulleys and a conveyor bed, wherein said conveyor bed includes lateral portions and a central portion, wherein said belt is a conveying belt, said head pulleys rotate to slide said belt on said central portion of said conveyor bed, wherein said lateral portions have a greater height than a height of said central portion, wherein said lateral portions have a rectangular elongated shape, having a planar bottom end, said belt is in abutting contact with said central portion of said conveyor bed, said belt has spikes, said spikes are configured to fix said partially made eggroll to said conveyor bed, wherein said spikes have a conical shape, wherein said spikes are equidistantly disposed along the outer surface of said conveyor belt;
   a pivoting assembly including a block, a pivot and fasteners, wherein said block has block spikes equidistantly disposed in a bottom end thereof, wherein said block spikes have a triangular shape, wherein a first end of said block is perpendicularly placed over said pivot, said block is capable of rotating over said pivot, said fasteners are attached to the sides of a second end of said block, said fasteners avoid said block to touch said conveying assembly, wherein said fasteners protrude downwardly from said second end having a predetermined inclination, wherein said fasteners rest over said lateral portions of said conveyor bed, said second end is diametrically opposite to said first end, said fasteners separate said block of said conveying assembly, said second end of said block moves up and down to accommodate different sizes of partially made eggrolls, said second end of said block moves up and down when said first end of said block rotates over said pivot, said pivot has openings to accommodate said block to predetermined heights of said pivot, wherein said openings are collinear therebetween, said openings form a vertical arrangement of openings having a predetermined separation therebetween, wherein each of said openings transversely go through said pivot, wherein said pivot has a right-trapezium shape, said block is separated a predetermined distance form said conveying assembly by means of said fasteners, said partially made eggroll slides with said conveying belt to said block, said block pushes said partially made eggrolls to form eggrolls; and an electronic assembly, wherein said electronic assembly includes a motor, a switch, and a cord, said motor is connected to said switch, said motor is connected to said head pulleys, said switch turns off or on said motor, said cord is connected to said motor, said cord is connected to the electrical outlet to provide power to said electronic assembly, said motor rotates said head pulleys to slide said bed along said conveyor bed.

\* \* \* \* \*